(12) United States Patent
Taylor, Jr. et al.

(10) Patent No.: US 12,312,815 B2
(45) Date of Patent: *May 27, 2025

(54) WALL PANEL

(71) Applicant: DDP Specialty Electronic Materials US, LLC., Wilmington, DE (US)

(72) Inventors: Charles David Taylor, Jr., Salisbury, NC (US); Paul Addison Brown, Salisbury, NC (US); Berthold Mueller, Salisbury, NC (US); Randal Scott Hoffner, Salisbury, NC (US); Stewart McIntyre Adams, Salisbury, NC (US); Jarrett B. Davis, Wilmington, DE (US)

(73) Assignee: DDP Specialty Electronic Materials US, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,979

(22) Filed: May 21, 2024

(65) Prior Publication Data

US 2024/0301702 A1  Sep. 12, 2024

Related U.S. Application Data

(63) Continuation of application No. 18/339,494, filed on Jun. 22, 2023, now Pat. No. 12,006,699, which is a
(Continued)

(51) Int. Cl.
*E04C 1/00* (2006.01)
*B32B 3/08* (2006.01)
(Continued)

(52) U.S. Cl.
CPC .......... *E04F 13/0875* (2013.01); *B32B 3/085* (2013.01); *B32B 7/08* (2013.01);
(Continued)

(58) Field of Classification Search
CPC .. E04F 13/0875; E04F 13/0873; B32B 13/02; E04C 2/04
See application file for complete search history.

(56) References Cited

U.S. PATENT DOCUMENTS

| 1,853,822 A | * | 4/1932 | Krauss | .................... E04F 13/14 |
| | | | | 428/156 |
| 2,064,789 A | | 12/1936 | Farber | |

(Continued)

FOREIGN PATENT DOCUMENTS

| AU | 2010101323 A4 | 1/2011 |
| DE | 2361018 A1 | 6/1978 |
| JP | 08189275 A | 7/1996 |

OTHER PUBLICATIONS

2 Page PDF Form the US Department of Energy Title Guide to Home Insulation, Oct. 2010.
(Continued)

*Primary Examiner* — Basil S Katcheves
(74) *Attorney, Agent, or Firm* — Shumaker, Loop & Kendrick, LLP; S. Alexander Long, Jr.

(57) ABSTRACT

The invention is related to a method of manufacturing a wall panel and a wall panel system. The method includes: forming a glass-fiber reinforced rigid magnesium oxide layer including the steps of: pouring or injecting a slurry of uncured magnesium oxide into a mold, embedding glass fiber reinforcing material therein, and curing the magnesium oxide to obtain the glass-fiber reinforced rigid magnesium oxide layer having a first side and a second side; applying, to the second side of the rigid magnesium oxide layer, an insulation layer, the insulation layer comprising a foam; and optionally applying to the first side of the rigid layer a veneer layer.

14 Claims, 15 Drawing Sheets

Related U.S. Application Data continuation of application No. 17/350,333, filed on Jun. 17, 2021, now Pat. No. 11,725,393, which is a continuation of application No. 17/102,711, filed on Nov. 24, 2020, now Pat. No. 11,313,134, which is a continuation of application No. 16/535,833, filed on Aug. 8, 2019, now Pat. No. 10,858,843, which is a continuation of application No. 15/969,239, filed on May 2, 2018, now Pat. No. 10,415,256, which is a continuation-in-part of application No. 15/940,174, filed on Mar. 29, 2018, now Pat. No. 10,858,842, which is a continuation of application No. 15/297,600, filed on Oct. 19, 2016, now Pat. No. 9,963,885, which is a continuation-in-part of application No. 15/138,638, filed on Apr. 26, 2016, now Pat. No. 9,957,722, which is a continuation of application No. 14/039,101, filed on Sep. 27, 2013, now Pat. No. 9,353,523.

(60) Provisional application No. 62/245,617, filed on Oct. 23, 2015, provisional application No. 61/706,148, filed on Sep. 27, 2012.

(51) Int. Cl.
| | | |
|---|---|---|
| *B32B 7/08* | (2019.01) | |
| *B32B 7/12* | (2006.01) | |
| *B32B 13/02* | (2006.01) | |
| *B32B 13/12* | (2006.01) | |
| *E04C 2/04* | (2006.01) | |
| *E04F 13/075* | (2006.01) | |
| *E04F 13/077* | (2006.01) | |
| *E04F 13/08* | (2006.01) | |
| *E04F 13/14* | (2006.01) | |
| *E04F 13/16* | (2006.01) | |
| *E04F 13/18* | (2006.01) | |
| *E04C 2/00* | (2006.01) | |
| *E04C 2/288* | (2006.01) | |

(52) U.S. Cl.
CPC ............. *B32B 7/12* (2013.01); *B32B 13/02* (2013.01); *B32B 13/12* (2013.01); *E04C 2/04* (2013.01); *E04F 13/075* (2013.01); *E04F 13/077* (2013.01); *E04F 13/0832* (2013.01); *E04F 13/0862* (2013.01); *E04F 13/0866* (2013.01); *E04F 13/0873* (2013.01); *E04F 13/14* (2013.01); *E04F 13/165* (2013.01); *E04F 13/185* (2013.01); *B32B 2260/044* (2013.01); *B32B 2262/101* (2013.01); *B32B 2607/00* (2013.01); *E04C 2002/007* (2013.01); *E04C 2/288* (2013.01)

(56) References Cited

U.S. PATENT DOCUMENTS

| | | | |
|---|---|---|---|
| 2,164,725 A * | 7/1939 | Snyder | ........... E04F 13/0873 |
| | | | 52/553 |
| 2,170,165 A | 8/1939 | Strong | |
| 2,198,466 A | 4/1940 | Stolze | |
| 2,825,221 A | 3/1958 | Brouk | |
| 3,304,673 A | 2/1967 | Ramoneda | |
| 3,350,827 A | 11/1967 | Sugar | |
| 3,362,116 A | 1/1968 | Murphy | |
| 3,602,476 A | 8/1971 | Iragorri | |
| 3,605,369 A | 9/1971 | Merrill et al. | |
| 3,646,715 A | 3/1972 | Pope | |
| 3,715,417 A | 2/1973 | Pope | |
| 3,740,909 A | 6/1973 | Stinnes | |
| 3,760,546 A | 9/1973 | Martin | |
| 3,842,559 A | 10/1974 | Payne | |
| 3,868,801 A | 3/1975 | Weiner | |
| 3,899,855 A | 8/1975 | Gadsby | |
| 3,944,425 A | 3/1976 | Magder | |
| 3,965,635 A | 6/1976 | Renkert | |
| 3,991,252 A | 11/1976 | Kolakowski | |
| 4,031,682 A | 6/1977 | Renkert | |
| 4,037,006 A | 7/1977 | Roberts | |
| 4,159,361 A | 6/1979 | Schupack | |
| 4,203,788 A | 5/1980 | Clear | |
| 4,219,984 A | 9/1980 | De San | |
| 4,296,789 A | 10/1981 | Schramm | |
| 4,298,413 A | 11/1981 | Teare | |
| 4,349,398 A | 9/1982 | Kearns | |
| 4,388,366 A | 6/1983 | Rosato | |
| 4,407,104 A | 10/1983 | Francis | |
| 4,494,349 A | 1/1985 | Clements | |
| 4,506,486 A | 3/1985 | Culpepper, Jr. | |
| 4,614,013 A | 9/1986 | Stevenson | |
| 4,617,219 A | 10/1986 | Schupack | |
| 4,646,498 A | 3/1987 | Schneller | |
| 4,657,798 A | 4/1987 | Gulhem | |
| 4,788,808 A | 12/1988 | Slocum | |
| 4,816,091 A | 3/1989 | Miller | |
| 4,841,702 A * | 6/1989 | Huettemann | ............. E04B 5/04 |
| | | | 52/794.1 |
| 4,916,004 A | 4/1990 | Ensminger | |
| 4,920,716 A | 5/1990 | Coffey | |
| 4,944,127 A | 7/1990 | Clear | |
| 5,003,743 A | 4/1991 | Bifano | |
| 5,007,532 A | 4/1991 | Binish | |
| 5,009,387 A | 4/1991 | Scott | |
| 5,231,813 A | 8/1993 | Drawdy | |
| 5,280,689 A | 1/1994 | Mill | |
| 5,394,672 A | 3/1995 | Seem | |
| 5,502,940 A | 4/1996 | Fifield | |
| 5,600,929 A | 2/1997 | Morris | |
| 5,626,936 A | 5/1997 | Alderman | |
| 5,657,597 A | 8/1997 | Loftus | |
| 5,681,639 A | 10/1997 | Minagawa | |
| 5,715,637 A | 2/1998 | Hesterman | |
| 5,735,092 A | 4/1998 | Clayton | |
| 5,836,572 A | 11/1998 | Sugiyama | |
| 5,839,251 A | 11/1998 | Weinstein | |
| 6,044,604 A | 4/2000 | Clayton | |
| 6,240,691 B1 * | 6/2001 | Holzkaemper | ......... E04B 1/942 |
| | | | 52/387 |
| 6,360,505 B1 | 3/2002 | Johns | |
| 6,516,578 B1 | 2/2003 | Hunsaker | |
| 6,701,683 B2 | 3/2004 | Messenger | |
| 6,857,248 B2 | 2/2005 | Ouellet et al. | |
| 6,951,086 B2 | 10/2005 | Passeno | |
| 7,165,374 B2 | 1/2007 | Ohanesian | |
| 7,641,812 B2 | 1/2010 | Alderman | |
| 7,658,050 B2 | 2/2010 | Bouchard | |
| 7,762,040 B2 | 7/2010 | Wilson | |
| 7,871,054 B2 | 1/2011 | Walters | |
| 7,908,814 B2 | 3/2011 | Wilson | |
| 8,287,997 B2 | 8/2012 | Paradis | |
| 8,273,415 B2 | 9/2012 | Porter | |
| 8,444,789 B2 | 5/2013 | Guo | |
| 8,621,801 B2 | 1/2014 | Bouchard | |
| 8,627,625 B2 | 1/2014 | Bouchard | |
| 9,234,355 B2 | 1/2016 | Sealock et al. | |
| 9,303,403 B2 | 4/2016 | Bolin | |
| 9,353,523 B2 | 5/2016 | Taylor, Jr. | |
| 9,809,981 B2 | 11/2017 | Ciuperca | |
| 9,957,722 B2 | 5/2018 | Taylor, Jr. et al. | |
| 9,963,885 B2 | 5/2018 | Taylor, Jr. | |
| 10,246,873 B1 | 4/2019 | Costanza | |
| 10,415,256 B2 | 9/2019 | Taylor, Jr. et al. | |
| 11,124,972 B2 * | 9/2021 | Jang | .................... E04F 13/0894 |
| 11,313,134 B2 * | 4/2022 | Taylor, Jr. | ................. E04C 2/04 |
| 2002/0182953 A1 | 12/2002 | Porter | |
| 2003/0213212 A1 | 11/2003 | Passeno | |
| 2005/0028476 A1 | 2/2005 | Bouchard et al. | |
| 2005/0076611 A1 | 4/2005 | Crawford | |
| 2005/0229504 A1 | 10/2005 | Bennet | |
| 2005/0229524 A1 | 10/2005 | Bennet | |

(56) References Cited

U.S. PATENT DOCUMENTS

| | | |
|---|---|---|
| 2005/0257469 A1 | 11/2005 | Bennet |
| 2006/0174572 A1 | 8/2006 | Tonyan |
| 2007/0261340 A1 | 11/2007 | Cecilio |
| 2008/0066412 A1 | 3/2008 | Franco et al. |
| 2009/0011207 A1* | 1/2009 | Dubey ................ C04B 20/1051 |
| | | 106/669 |
| 2009/0065972 A1 | 3/2009 | Feigin et al. |
| 2009/0193742 A1* | 8/2009 | Wolf ...................... B29C 39/36 |
| | | 52/311.1 |
| 2009/0211692 A1 | 8/2009 | Krebs |
| 2009/0320397 A1 | 12/2009 | Hansbro et al. |
| 2010/0095629 A1 | 4/2010 | Taylor |
| 2010/0126114 A1 | 5/2010 | Sadler |
| 2010/0199586 A1 | 8/2010 | Martineau |
| 2010/0297411 A1 | 11/2010 | Tsai |
| 2011/0239566 A1 | 10/2011 | Ciuperca |
| 2011/0238916 A1 | 11/2011 | Pardue, Jr. |
| 2012/0266554 A1 | 10/2012 | Fifield |
| 2014/0069050 A1 | 3/2014 | Bolin |
| 2014/0083040 A1* | 3/2014 | Taylor, Jr. ............ E04F 13/077 |
| | | 52/741.1 |
| 2014/0093679 A1 | 4/2014 | Okamoto |
| 2014/0109504 A1* | 4/2014 | Steffes ................ E04F 13/0851 |
| | | 52/506.06 |
| 2014/0234560 A1 | 8/2014 | Miyata |
| 2015/0052838 A1 | 2/2015 | Ritchie |
| 2015/0218829 A1* | 8/2015 | Curtis ................ E04F 13/0873 |
| | | 52/506.05 |
| 2015/0233122 A1* | 8/2015 | Dickey ................ E04F 13/147 |
| | | 52/302.1 |
| 2016/0237692 A1 | 8/2016 | Taylor, Jr. et al. |
| 2016/0280879 A1 | 9/2016 | Brannum |
| 2017/0037639 A1* | 2/2017 | Taylor, Jr. ............... B32B 13/02 |
| 2018/0051471 A1* | 2/2018 | Goldsmith ............ E04F 13/083 |
| 2018/0187420 A1 | 7/2018 | Taylor |
| 2019/0119927 A1 | 4/2019 | Hunsaker |
| 2021/0310255 A1 | 10/2021 | Taylor |
| 2022/0090387 A1 | 3/2022 | Hunsaker |

OTHER PUBLICATIONS

International Search Report for PCT/US2016/029954 Dated Oct. 7, 2016 10 Pages.

* cited by examiner

WALL PANEL

CROSS REFERENCE TO RELATED APPLICATIONS

This application is a Continuation of U.S. patent application Ser. No. 18/339,494, filed on Jun. 22, 2023, which is a continuation of U.S. patent application Ser. No. 17/350,333, filed on Jun. 17, 2021, which is a continuation of U.S. patent application Ser. No. 17/102,711, filed on Nov. 24, 2020, which is a Continuation of co-pending U.S. patent application Ser. No. 16/535,833, filed on Aug. 8, 2019, which is a continuation of co-pending U.S. patent application Ser. No. 15/969,239, filed on May 2, 2018, which is Continuation-in-Part of co-pending U.S. patent application Ser. No. 15/940,174 filed on Mar. 29, 2018, which is a Continuation application of U.S. patent application Ser. No. 15/297,600 filed on Oct. 19, 2016, which is a non-provisional application of U.S. Patent Application No. 62/245,617 filed on Oct. 23, 2015. The application Ser. No. 15/297,600 is also a Continuation-in-Part of U.S. patent application Ser. No. 15/138,638 filed on Apr. 26, 2016, which is a continuation of U.S. patent application Ser. No. 14/039,101 filed on Sep. 27, 2013, which is a non-provisional application of U.S. Provisional Application No. 61/706,148, filed on Sep. 27, 2012.

Accordingly, this application expressly claims priority to and incorporates by reference the entirety of U.S. patent application Ser. No. 18/339,494, filed on Jun. 22, 2023, which is a continuation of U.S. patent application Ser. No. 17/350,333, filed on Jun. 17, 2021, which is a continuation of U.S. patent application Ser. No. 17/102,711, filed on Nov. 24, 2020, which is a continuation of U.S. patent application Ser. No. 16/535,833, filed on Aug. 8, 2019, which is a continuation of co-pending U.S. patent application Ser. No. 15/969,239, filed on May 2, 2018, U.S. patent application Ser. No. 15/940,174 filed on Mar. 29, 2018; U.S. patent application Ser. No. 15/297,600, filed on Oct. 19, 2016; U.S. Patent Application No. 62/245,617, filed on Oct. 23, 2015; U.S. patent application Ser. No. 15/138,638, filed on Apr. 26, 2016; U.S. patent application Ser. No. 14/039,101, filed on Sep. 27, 2013, and U.S. Provisional Application No. 61/706,148, filed on Sep. 27, 2012.

TECHNICAL FIELD AND BACKGROUND OF INVENTION

The invention relates to the field of building construction materials. More particularly, the invention relates to the field of construction components used in the construction of walls, ceilings and other planar, angled and curved surfaces for buildings.

Humans have utilized bricks and other hard surfaces as construction components for buildings for thousands of years. The earliest sun-dried bricks were made in Ancient Egypt. Later, bricks were dried using a fuel source. The Book of Genesis records that burnt brick was used in the construction of the Tower of Babel. Thus, from ancient times to the present, brick has remained a popular building material.

The enduring presence of brick is due in no small part to its stellar properties as an exterior surface. Bricks are capable of resisting high summer heat, as well as, cold winters and changes there between. In addition to such thermal properties, brick provides a strong outer shell to a building. Brick resists wind, rain, snow, dust and other detrimental environmental elements. Brick can be a fire retardant surface for buildings. Bricks can be manufactured in a myriad of sizes, textures and colors. Further, though it need not be painted, when brick is painted, the paint adheres well to the brick.

However, despite such positive characteristics, brick has a few drawbacks, mostly related to installation. For instance, whereas other exterior surfaces maybe relatively easily applied to an existing building structure, brick is much more difficult to install on an existing building as an alternate siding choice during a renovation. Further, the laying of brick during the construction of a building is a labor-intensive operation. Each brick must be mortared and laid, one on another, brick-by-brick, by a skilled brick mason. As manual labor prices rise in a given market, so do the costs associated with using brick as a building material. It is also difficult or impossible to install brick during the winter because mortar does not cure well or at all in freezing temperatures.

Thus, there exists a need for a building product that has the same or better building characteristics and aesthetic appeal as traditional brick but also can be applied without the need for an extensive skilled labor team of brick masons. Further, there exists a need for a building product that has the same or better building characteristics and aesthetic appeal as traditional brick that may be used as a retrofit product for providing a siding to an existing building structure. Further, as energy costs and environmental consciousness increase, so does the demand for better insulation. Thus, there is also a need for building materials offering improved insulation of a building's envelope.

Thermal insulation is an ever expanding field. Various forms of insulation have been used including fiberglass, cellulous, and various foams among others. Recently there has been much research into the field of phase change materials which are referred to as "PCMs". PCMs are generally described in U.S. Pat. No. 7,641,812 which is directed to a Thermal Insulation with Thin Phase Change Layer.

SUMMARY OF THE INVENTION

In one aspect, the present invention includes a method of manufacturing a wall panel. The method includes: forming a glass-fiber reinforced rigid magnesium oxide layer including the steps of: i) pouring or injecting a slurry of uncured magnesium oxide into a mold, ii) embedding glass fiber reinforcing material therein, and iii) curing the magnesium oxide to obtain the glass-fiber reinforced rigid magnesium oxide layer having a first side and a second side; applying, to the second side of the rigid magnesium oxide layer, an insulation layer, the insulation layer comprising a foam; and applying to the first side of the rigid layer a veneer layer.

In some embodiments, the glass-fiber reinforcing material is configured to be the principal load carrying member of the wall panel.

In some embodiments, the insulation layer has a uniform thickness and an insulation factor greater than or equal to R7 and less than or equal to R21.

In some embodiments, the veneer layer is c brick, ceramic tile, porcelain tile, natural stone, engineered stone, wood, ceramic, plastic, vinyl, or paint. In some embodiments, the veneer layer functions as a water-resistive barrier.

In another aspect, the invention includes a method of forming a wall panel for a building structure. The method includes: providing a plurality of wall panels, each of the plurality of wall panels comprising: a rigid magnesium oxide layer having a first side and a second side, the rigid magnesium oxide layer having glass fiber reinforcing material embedded therein; and a foam layer on the second side of the rigid magnesium oxide layer; and securing each of the plurality of wall panels to a structural element; wherein the wall panel system further comprises an applied veneer layer on the first side of the rigid magnesium oxide layer; and wherein the seams are sealed between the respective wall panels.

In some embodiments, the seams are sealed with a sealing compound.

In some embodiments, the veneer layer is applied to overlap the seams between respective wall panels. In some embodiments, the veneer layer is brick, ceramic tile, porcelain tile, natural stone, engineered stone, wood, ceramic, plastic, vinyl, or paint. In some embodiments the veneer layer functions as a water-resistive barrier.

In some embodiments, the glass-fiber reinforcing material is configured to be the principal load carrying member of the wall panel.

In some embodiments, the insulation layer has a uniform thickness and an insulation factor greater than or equal to R7 and less than or equal to R21.

In some embodiments, the rigid magnesium oxide layer is a poured, injected, press-molded, extruded, vibration cast, sprayed, or slip formed layer.

In another aspect, the invention includes a wall panel. The wall panel includes: a rigid magnesium oxide layer having a first side and a second side, the rigid magnesium oxide layer comprising a glass fiber reinforcing material; and a foam layer attached to the second side of the rigid magnesium oxide layer.

In some embodiments, the wall panel further includes a veneer layer attached to the first side of the rigid magnesium oxide layer. In some embodiments, the veneer layer is brick, ceramic tile, porcelain tile, natural stone, engineered stone, wood, ceramic, plastic, vinyl, or paint. In some embodiments the veneer layer functions as a water-resistive barrier.

In some embodiments, the rigid magnesium oxide layer is a poured, injected, press-molded, extruded, vibration cast, sprayed, or slip formed layer.

BRIEF DESCRIPTION OF THE DRAWINGS

Features, aspects, and advantages of a preferred' embodiment of the invention are better understood when the detailed description is read with reference to the accompanying drawings, in which.

DETAILED DESCRIPTION

Figure 1:
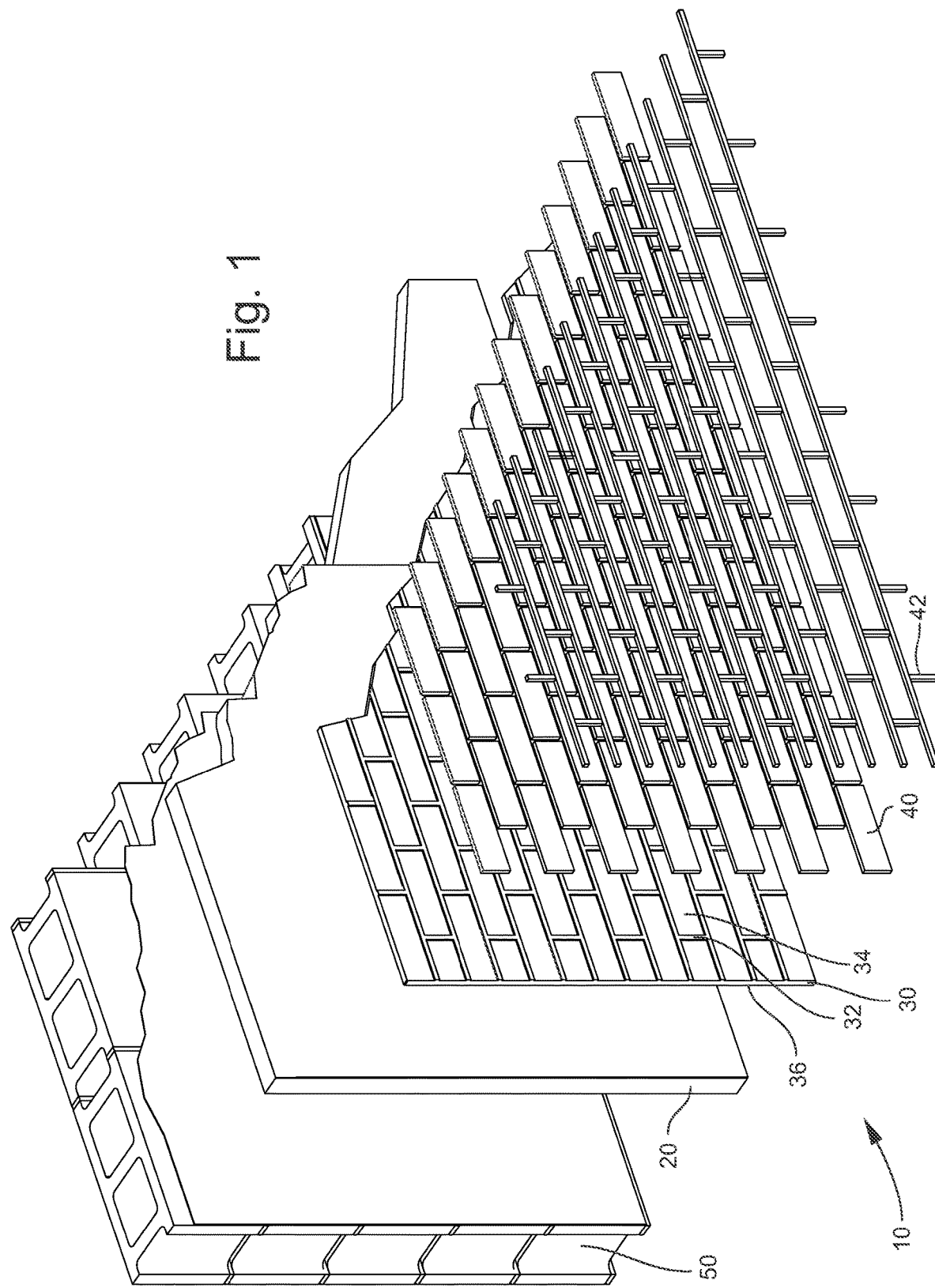
FIG. 1 is an exploded perspective view of an embodiment of the invention showing the layers.

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Referring to FIGS. 1-5, the invention is an insulated wall panel 10 having three layers, 20, 30 and 40. The panel 10 provides a finished aesthetic surface to a building, a structural component to a building and an insulation factor for a building. As such, the installed wall panel 10 includes an inner insulation layer 20, a middle cement layer 30 and an outer veneer layer 40. The panel 10 maybe attached to a building wall 50.

Figure 4:
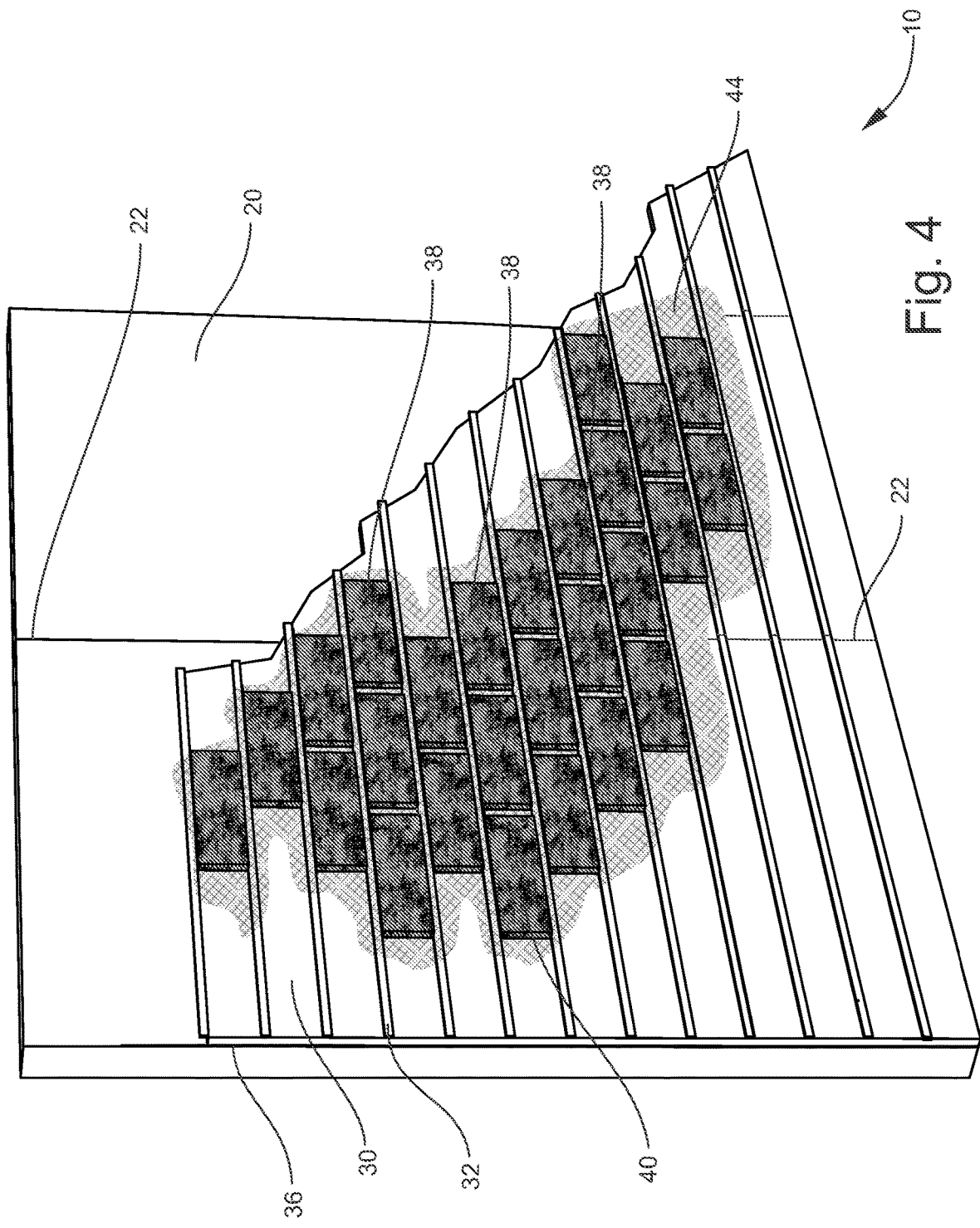
FIG. 4 is perspective view of an embodiment of the invention showing two adjacent panels with the outer veneer layer partially attached and covering the joint between the two adjacent panels.

The outer veneer layer 40 may include brick (as shown in the drawings) but may also include stone, tile, engineered stone, and/or similar material depending on desired finish effect. Thus, the use of the term "brick" herein is synonymous and inclusive of other veneers thus listed. The veneer layer 40 is relatively thin and is attached to the middle cement layer 30 using mortar 44 or other appropriate material such as a chemical adhesive as best shown in FIG. 4. Each brick (or other material as desired) of the veneer layer 40 is thin and is defined by a perimeter.

The middle layer 30 provides a substrate to which the brick of the veneer 40 is applied upon installation on a' building structure 50. The middle layer 30 has a plurality of sets of relief lines 32, Each set of relief lines 32 define a boundary that is just larger than the perimeter of a particular brick of the veneer layer 40 that is to be applied to the middle layer 30. The relief lines 32 maybe formed to the thickness of the desired grout 42 spacing between the brick of the veneer layer 40.

The middle layer 30 is made of a cementatious product with a glass fiber reinforcing material embedded therein. The glass fiber has high strength and is the principal load-carrying member of the middle layer 30 while the cement forms a matrix that allows the fibers to retain their desired location and orientation. The resultant product is thin and strong.

In order to form the middle layer 30, a mold is first constructed into which a slurry of uncured cementatious product of the middle layer 30 is poured. The mold will have the negatives of the relief lines 32 formed therein. These negatives will appear as small trenches within the mold such that when the cement cures and the middle layer 30 is removed from the mold, the relief lines 32 will protrude outward from the otherwise generally planar outer surface 34 of the middle layer. The inner surface 36 of the middle layer 30 will also be generally planar but will not have such relief lines 32. The middle layer 30 may remain in the mold while curing. Curing time is dependent upon the thickness, particulars of the mix design and the environment in which the cement is being cured. Preferably, the middle cement layer 30 is cured in a chamber.

Once cured, the middle layer 30 is then placed in a fixture that allows the inner insulation layer 20 to be applied and attached to the inner surface 36 of the middle layer 30. The inner insulation layer 20 is a rigid pour foam that is formed from a two-part Class 1 rated urethane. The foam is non-CFC and non-HCFC. The foam is applied to the inner surface 36 of the middle layer 30 using a machine calibrated to deliver proper and consistent component mix. The finished urethane material 20 will have an in place density of approximately 2.2 pounds per cubic foot. The foam 20 adheres to the middle layer 30 such that the machine delivery and mixing of the components provides for a complete bond between the middle layer 30 and inner insulation layer 20, Thus, there are no adhesives or other chemical bonding required to achieve the strength of the final insulated panel 10. The inner insulation layer 20 maybe one inch thick or up to three inches thick or greater depending on the level of insulation desired for a particular application.

Alternatively, rather than being poured, the middle layer 30 may be press-molded, extruded, vibration cast, sprayed or slip formed, If, in alternate embodiments, attachment points 54 or other items are incorporated into the structure, they are placed in the mold prior to the injection of the urethane.

Figure 2:
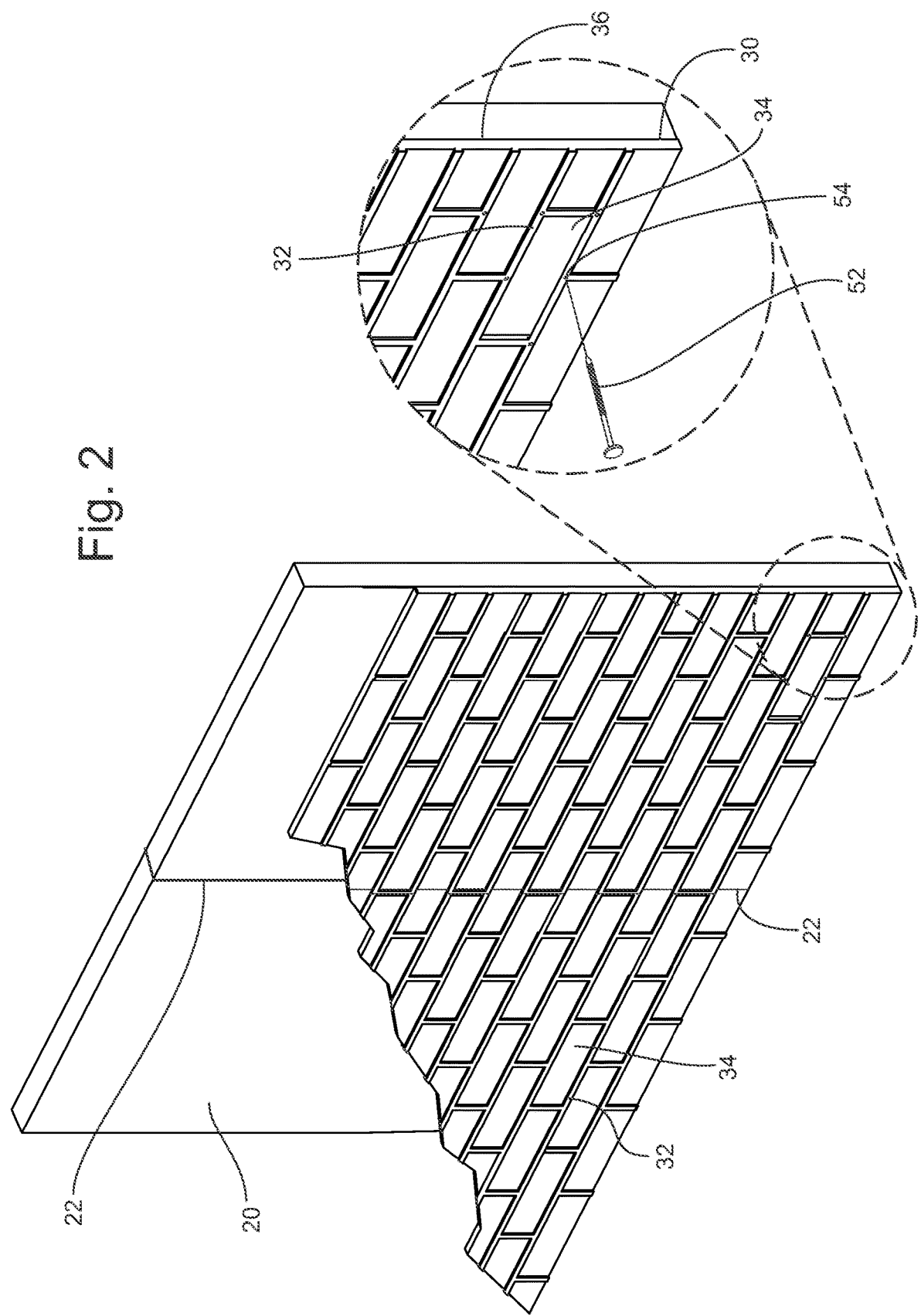
FIG. 2 is a partial perspective view of an embodiment of the invention showing two adjacent panels and highlighting the attachment of the panels to a wall.
Figure 3:
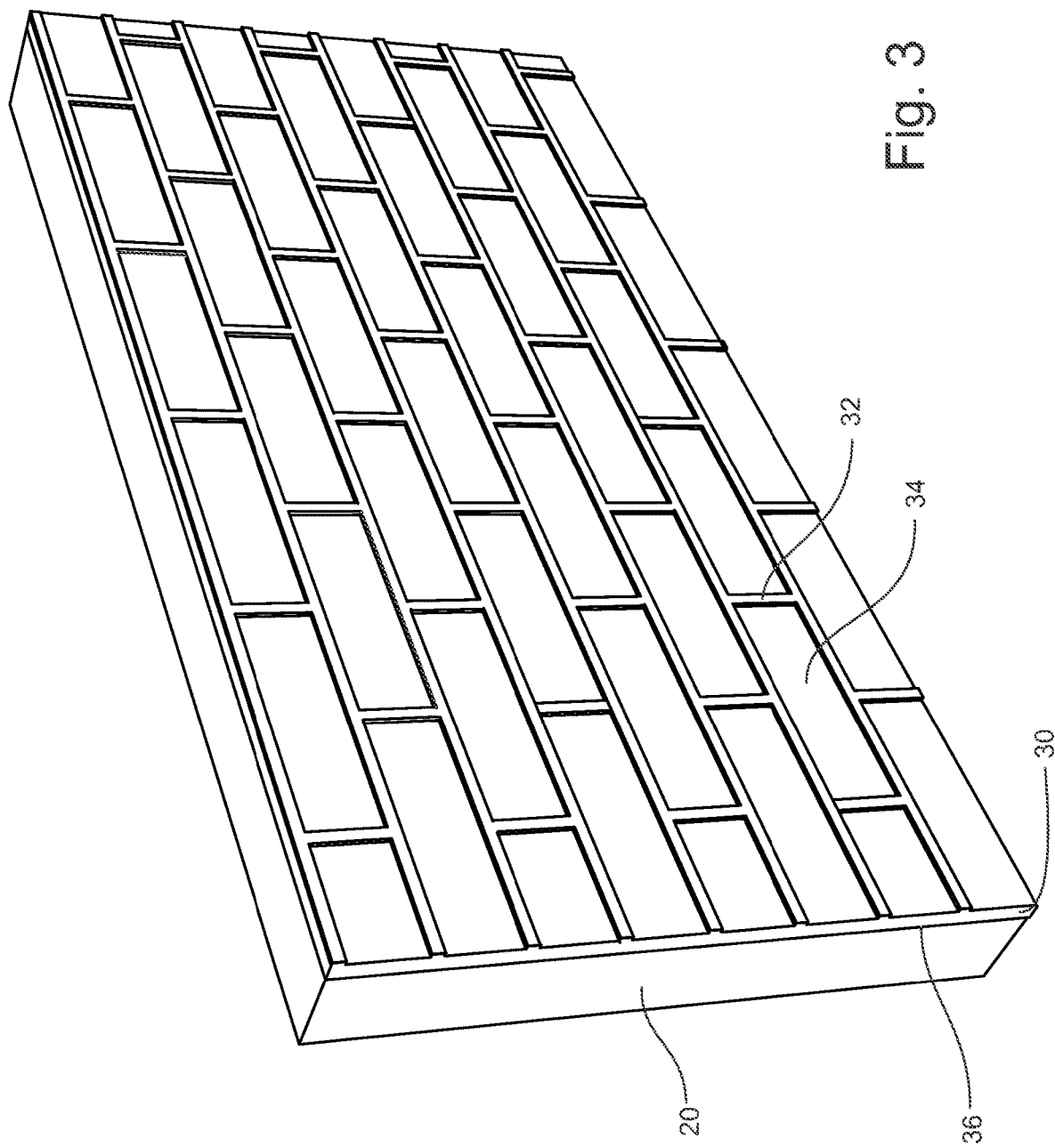
FIG. 3 is a perspective view of an embodiment of the invention showing one panel without the outer veneer layer attached.
Figure 5:
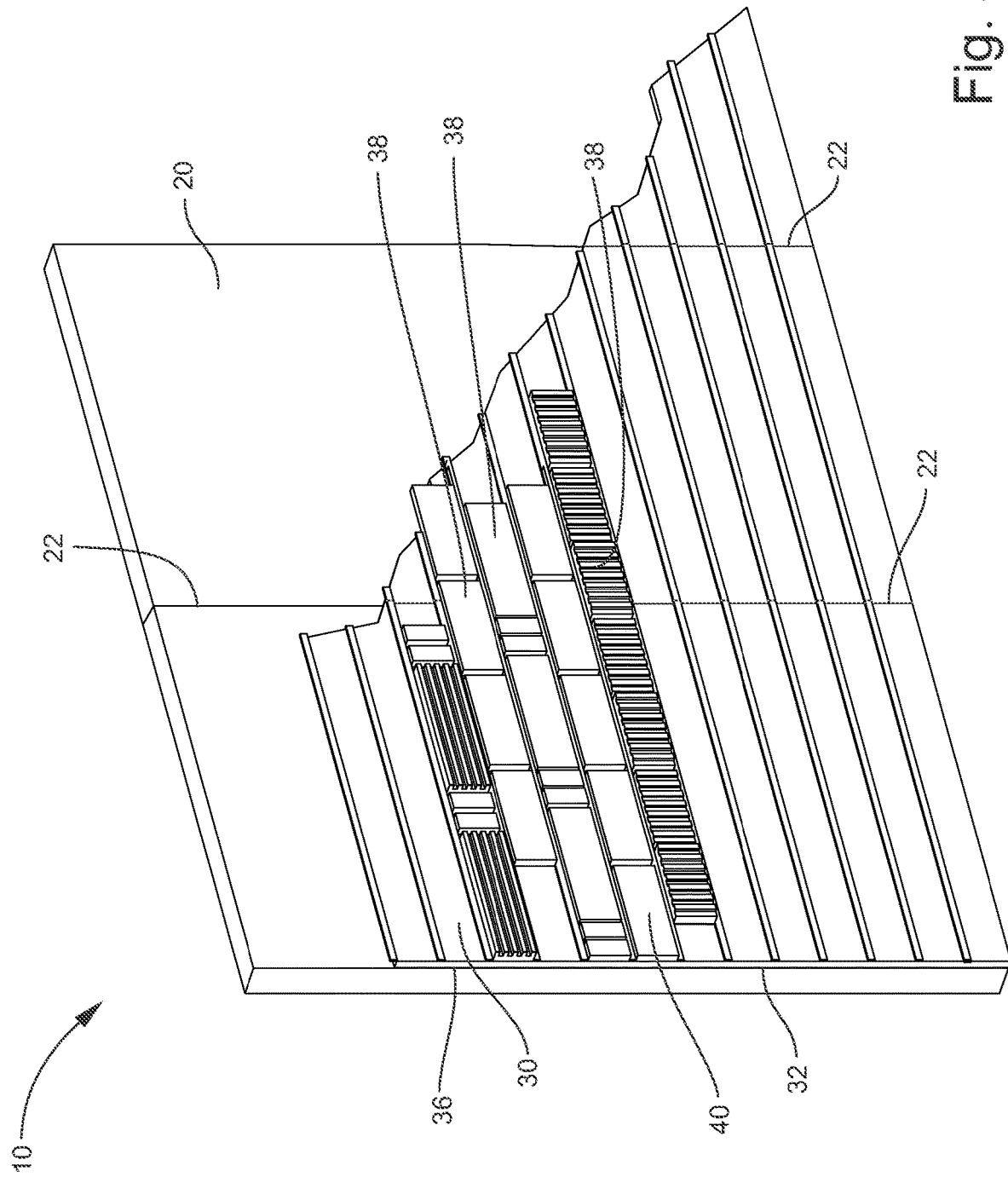
FIG. 5 is a perspective view of an embodiment of the invention showing adjacent panels with the outer, veneer layer partially attached and covering the joint between two adjacent panels.

Once the cement and urethane foam of the respective middle 30 and inner 20 layers has cured, the panel 10 is in condition for application to a building 50. As shown in FIG. 2, the panels 10 are screwed with screws 52 to the wall 50 or other structural element of a building. End pieces, headers and other trim pieces, having been similarly manufactured, are likewise attached to the building. The seams 22 between the respective panels and trim pieces are sealed with a sealing compound, such as Laticrete® Air and Water Barrier. Next, as shown in FIG. 4, an adhesive such as mortar 44 is applied to the outer surface of the middle layer 30. Next, the brick of the veneer layer 40 are applied on top of the adhesive 44 and between the relief lines 32. The brick of the veneer 40 are applied to overlap 38 the seams 22 in the panels 10. This overlapping 38 of the seams is best shown in FIGS. 4 and 5. Finally, a grout 42 or other material is applied between the gaps in the brick of the veneer 40.

Referring to FIGS. 6-12, the invention includes an embodiment 100 utilizing a two-part veneer layer 140. The top part of the veneer layer maybe brick 146 as shown. However, the invention contemplates that the concrete, tile, stone, wood, plastic, vinyl and other materials maybe utilized. As used herein, unless otherwise specified, the term "brick" will include all other such materials.

In addition to the two-part veneer layer 140, the invention may utilize a middle layer 130. This middle layer 130 maybe formed from cement or from magnesium oxide or from another composite material. Preferably, an insulating layer 120 is adhered to the middle layer 120. The inner insulation layer 120 is preferably a rigid pour foam that is formed from a two-part Class I rated urethane.

Figure 10:
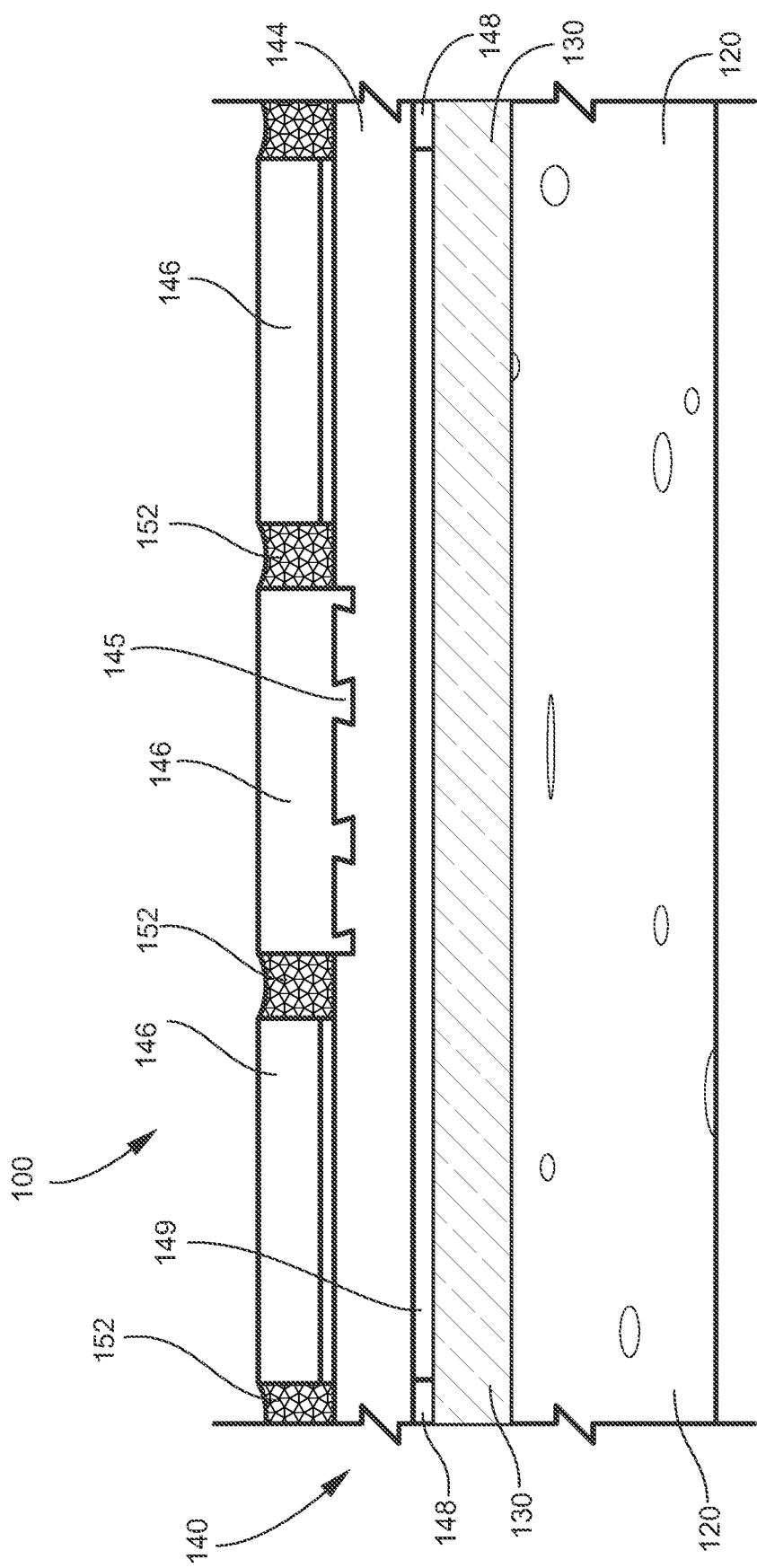
FIG. 10 is a sectional view of an embodiment of the invention showing the use of dovetailed brick.

The brick 146 is embedded in a substrate 144. This substrate 144 may be polyurethane or other plastic, cement, glass fiber reinforced concrete (GFRC), ceramic or other composite liquid product. The two-part layer is formed by having the brick 146 positioned in a mold according to desired pattern. The brick 146 maybe coated with wax or other protective coating. Sand maybe utilized as a release agent. The substrate 144 is then poured into the mold and surrounds a lower portion of the brick 146, thereby embedding the brick 146 in the substrate 144 as the substrate hardens. The brick 146 may have a smooth lower surface or may have notches, which may be dovetail notches 145 as shown in FIG. 10.

Importantly, especially for exterior application, the mold (not shown) includes a plurality of parallel grooves which, when filled with the substrate 144 form ridges 148 in the substrate 144. These ridges 148 may be seen in the assembled sectional views of FIGS. 8, 9, and 10. Between each ridge is a void 149, which forms a channel through which moisture, water and other fluids may pass between the substrate 144 and the middle cement layer 130. Such fluid may exit through weep holes (not shown), For interior application, no such void 149 may be necessary and the substrate layer 144 may not have the ridges and maybe directly attached to the middle layer 130. Likewise, for interior application, the middle layer 130 and the insulation layer 120 may not be used and the substrate may be adhered directly to an underlying construction element such as stud walls.

Figure 6:
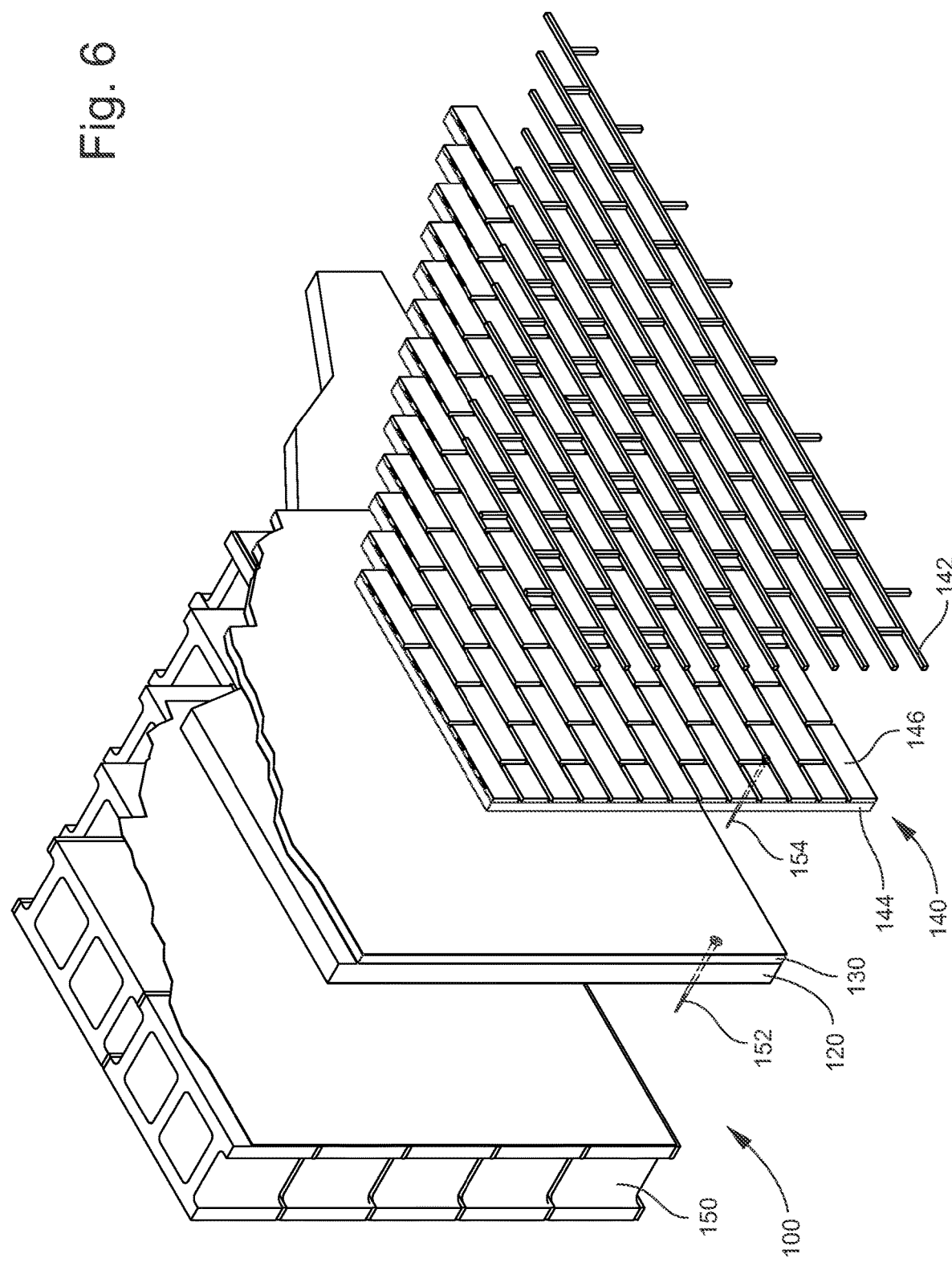
FIG. 6 is an exploded view of an embodiment of the invention showing the layers.
Figure 7:
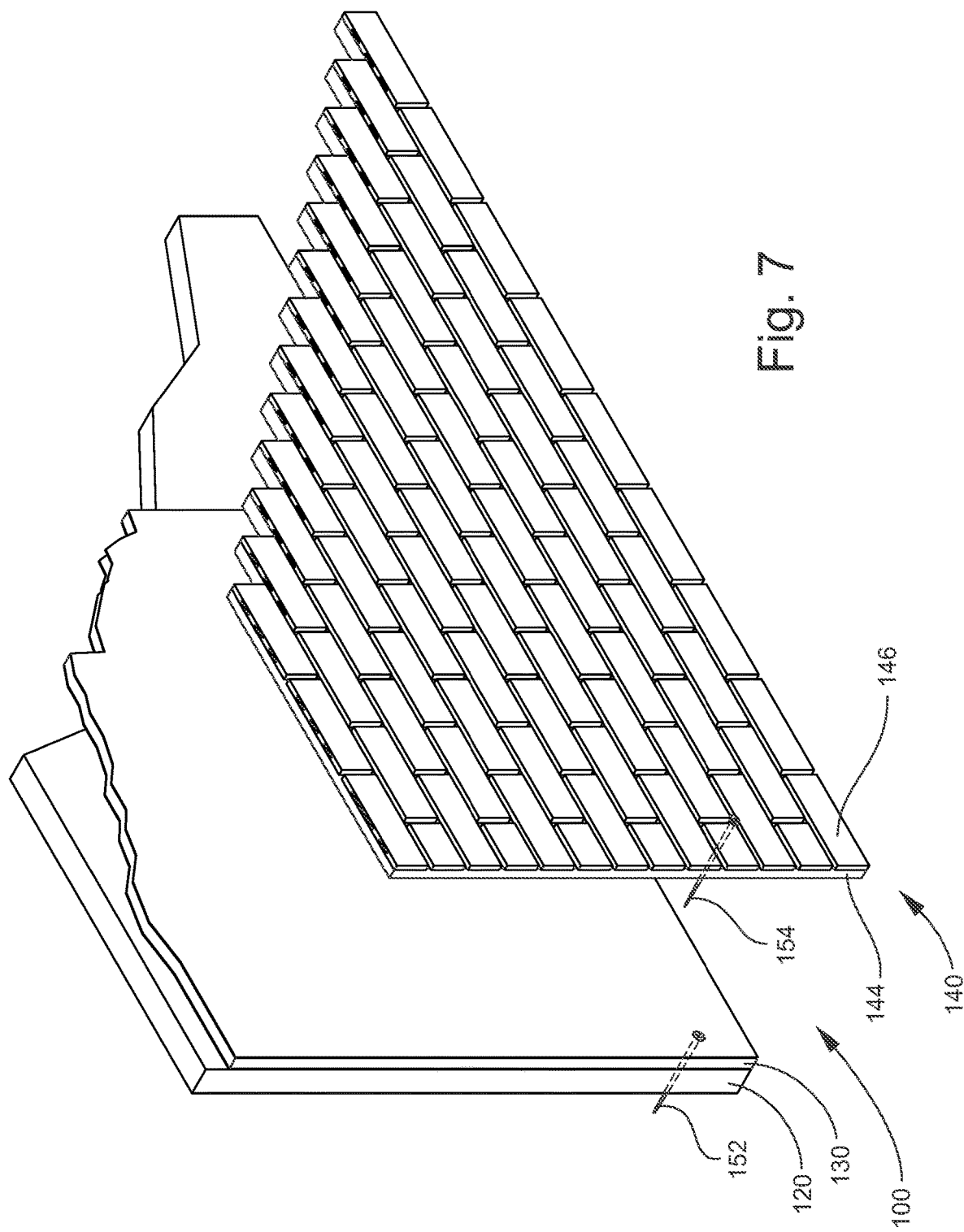
FIG. 7 is a partially exploded view of an embodiment of the invention showing the middle cement layer adhered to the insulation layer and showing the brick embedded in the substrate forming the two-part veneer layer.
Figure 8:
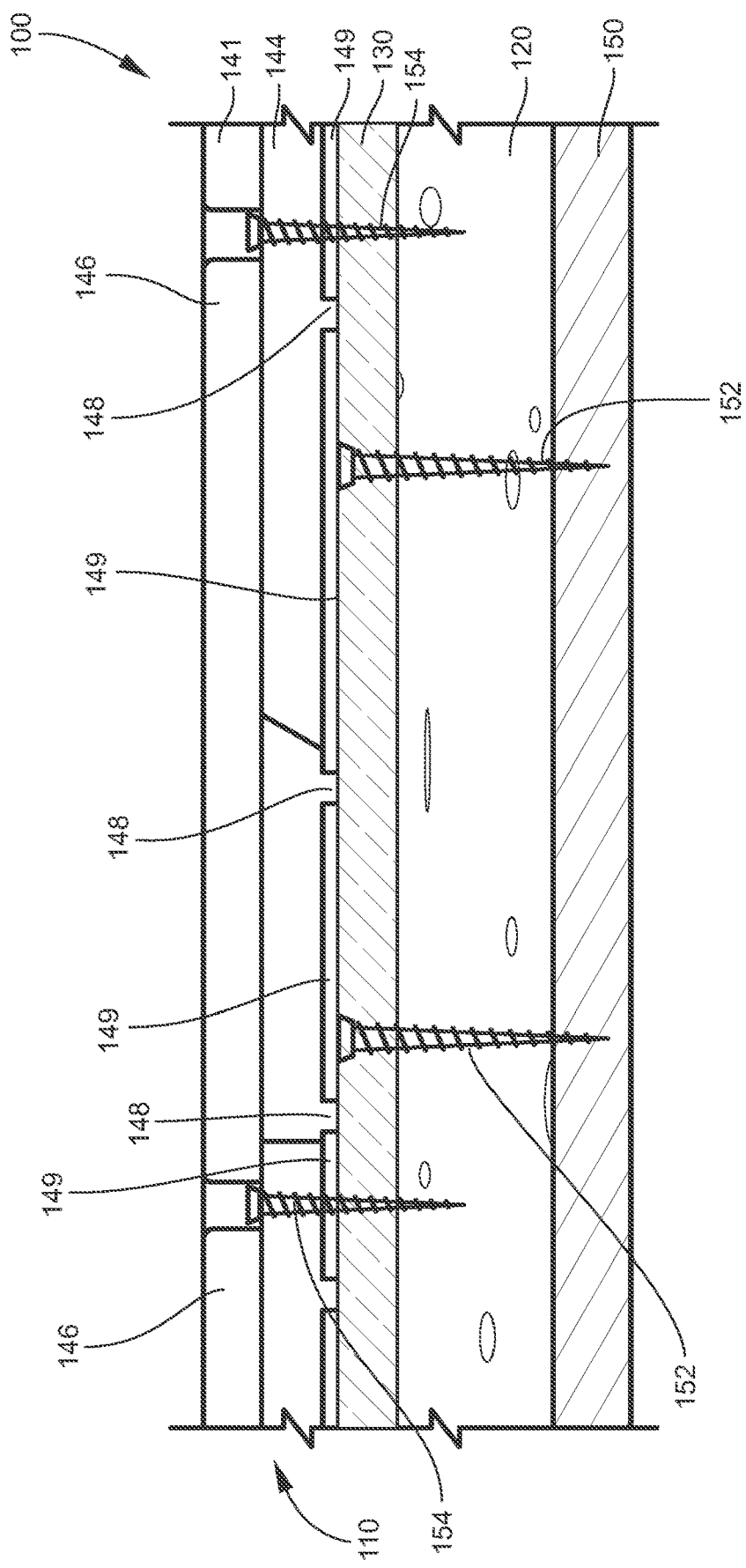
FIG. 8 is a sectional view of an embodiment of the invention attached to a planar surface.
Figure 9:
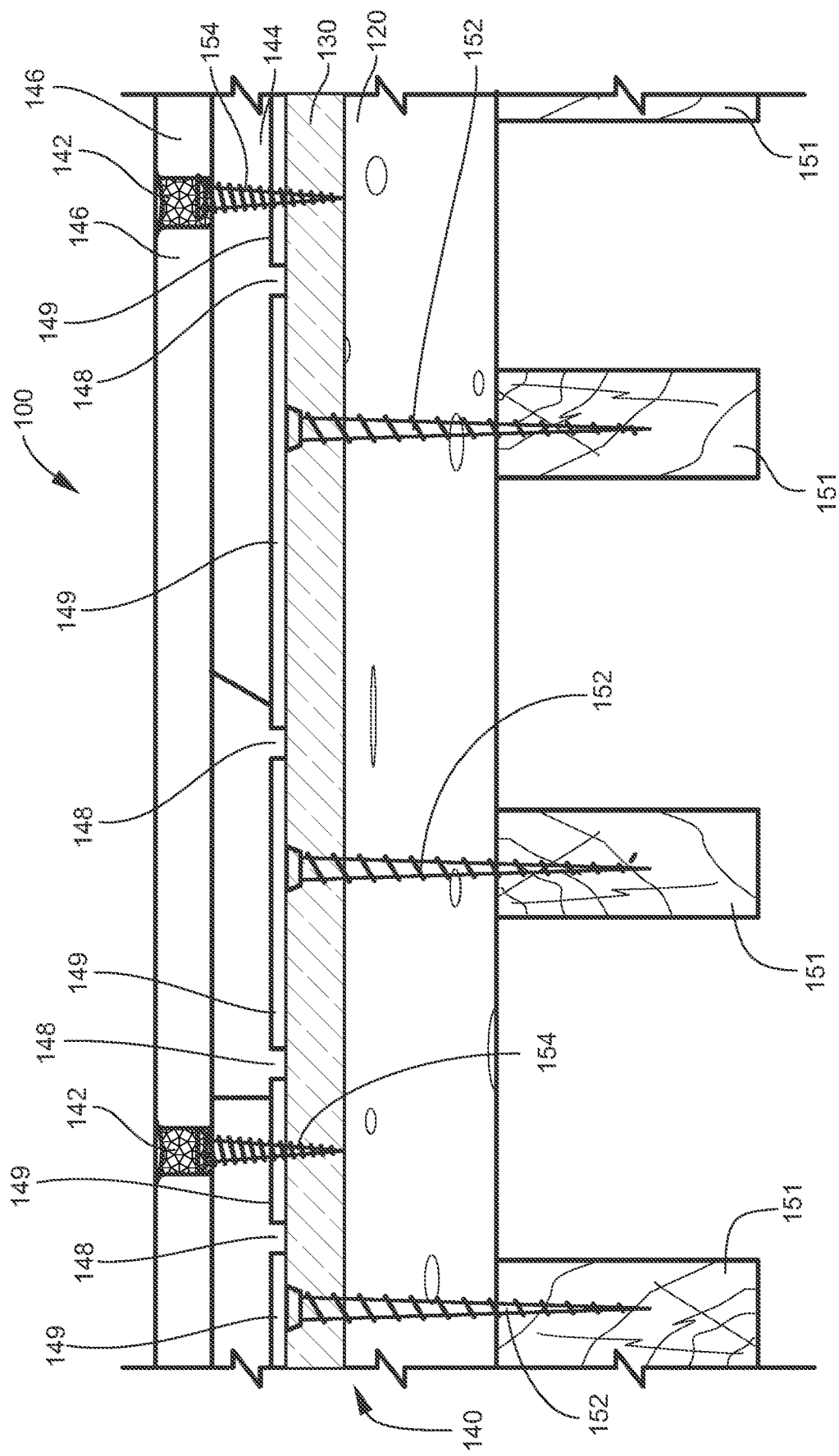
FIG. 9 is a sectional view of an embodiment of the invention attached to a plurality of studs.

In practice, the two-part veneer layer 140 may be supplied to building contractors as one element and the combination of the middle layer 130 and the insulation layer 120 may be supplied to building contractors as a second element. The second element 120, 130 may be attached via attachment means such as screws 152 to a block wall 150 as shown in FIG. 6 or studs 151 as shown in FIG. 9. The first element 140 maybe attached to the second element 120, 130 via attachment means such as screws 154. Preferably, screws 154 do not extend all the way through the second element 120, 130 so that the thermal barrier is not breached. After these first and second elements have been added to a building structure, grout/mortar 142 may be pointed into the voids between the brick 146. This grout/mortar 142 may conceal screw heads/holes 154 and joints 147 as shown in FIG. 9. Different grout/mortar joints are possible including raked, grapevine, extruded, concave, V, struck, flush, weathered, struck and convex.

Alternatively, the substrate 144 may additionally comprise a sand additive, which mimics the appearance of grout. In this embodiment, no additional grout/mortar needs to be added following installation of the top veneer layer except that a small amount of grout/mortar or an equivalent matching concealer such as caulk maybe added to conceal screw/attachment heads and/or joints between panels.

Figure 11:
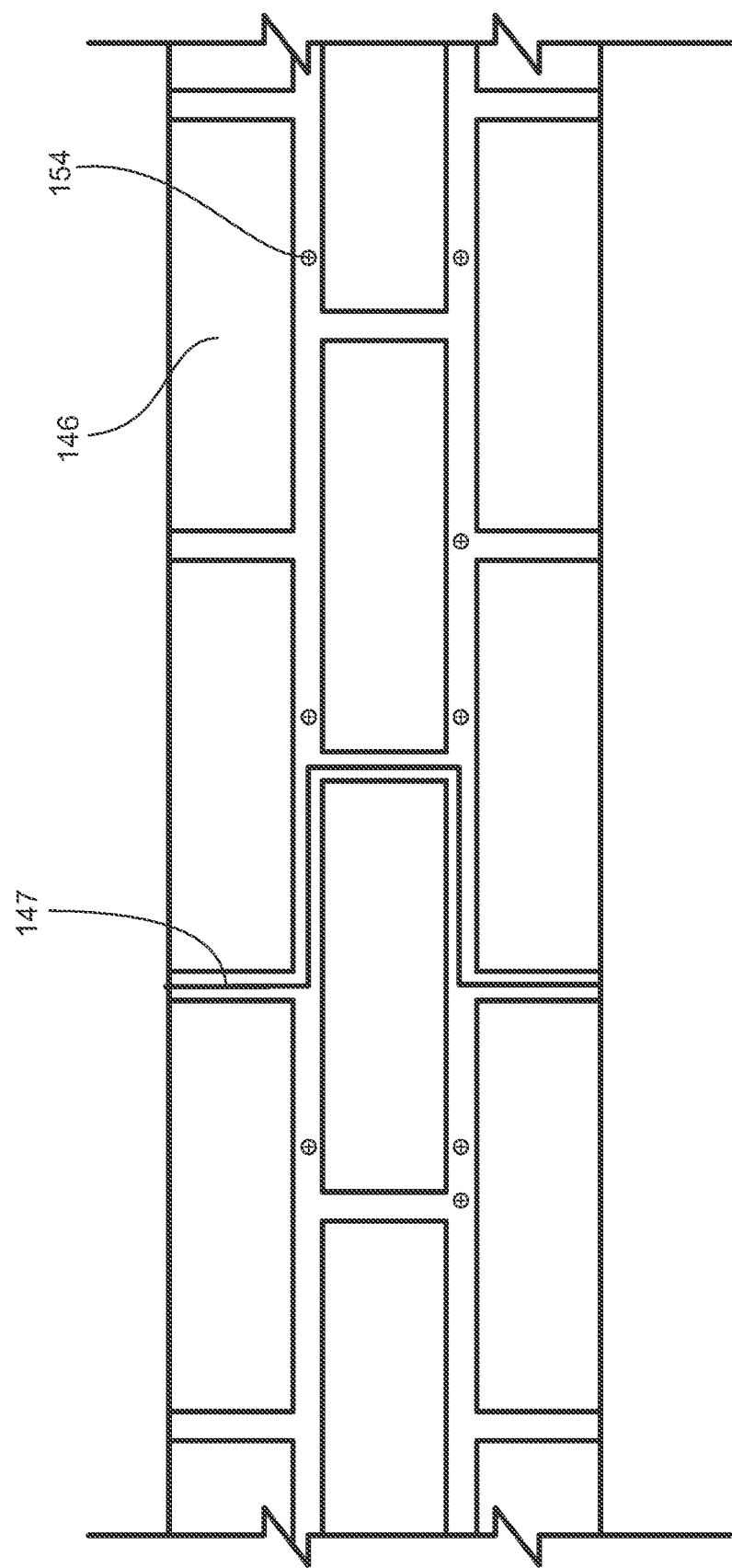
FIG. 11 is a partial front view of an embodiment of the invention showing joints between panels and attachment means.
Figure 12:
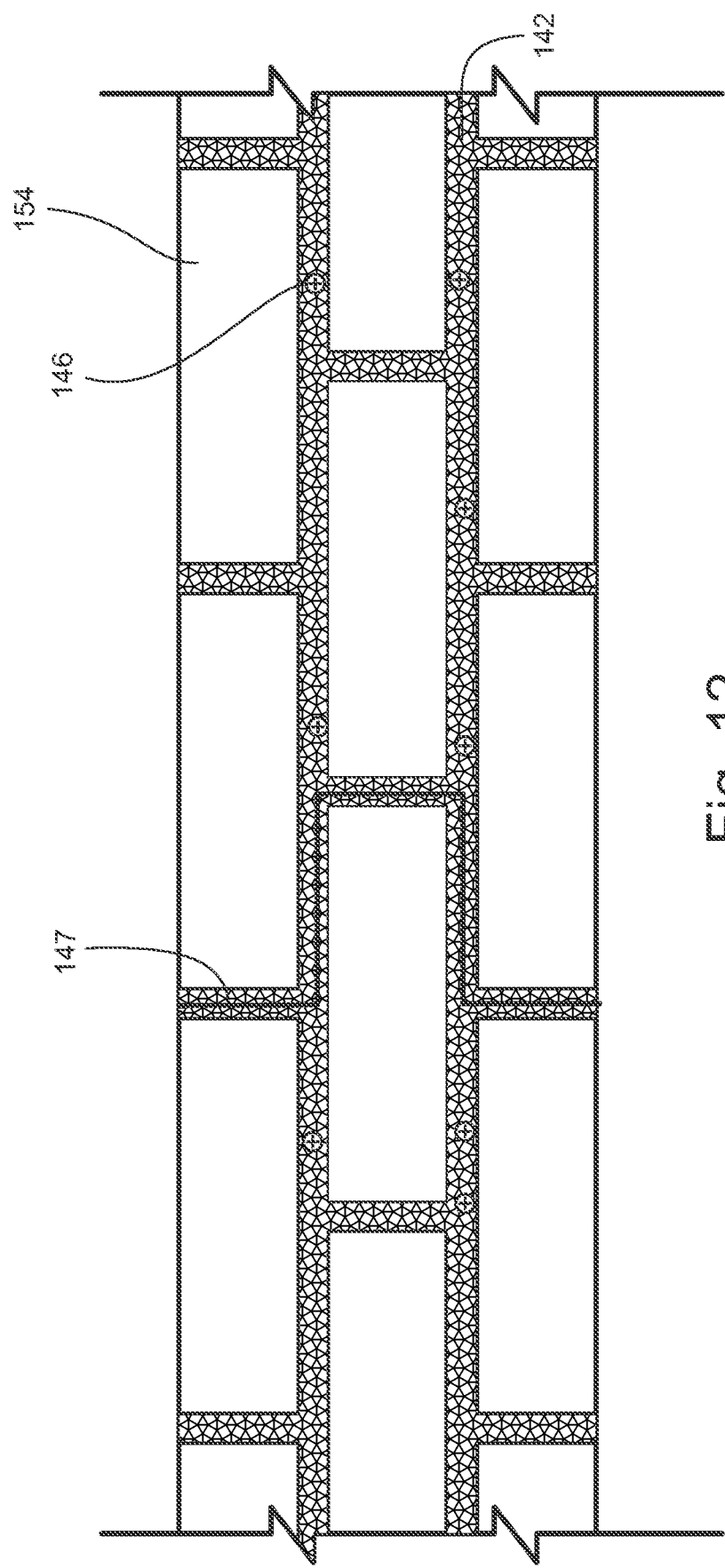
FIG. 12 is a partial front view of an embodiment of the invention showing mortar pointed between the brick and joints between panels and attachment means that have not yet been covered with mortar or other concealing compound.

The above description has contemplated use in a wall system for either exterior or interior use. However, the invention 100 contemplates use both in ceiling applications (not shown) and in paving and flooring applications (not shown). As shown in FIGS. 11 and 12, the joints between panels of the top two-part veneer layer 140 may be staggered to form an interlocking pattern. It is contemplated that panels of the invention 100 may be cut as needed in a particular application. Corners, reliefs, window edging, keystones and starter courses are also contemplated under the same methods as discussed above.

Figure 13:
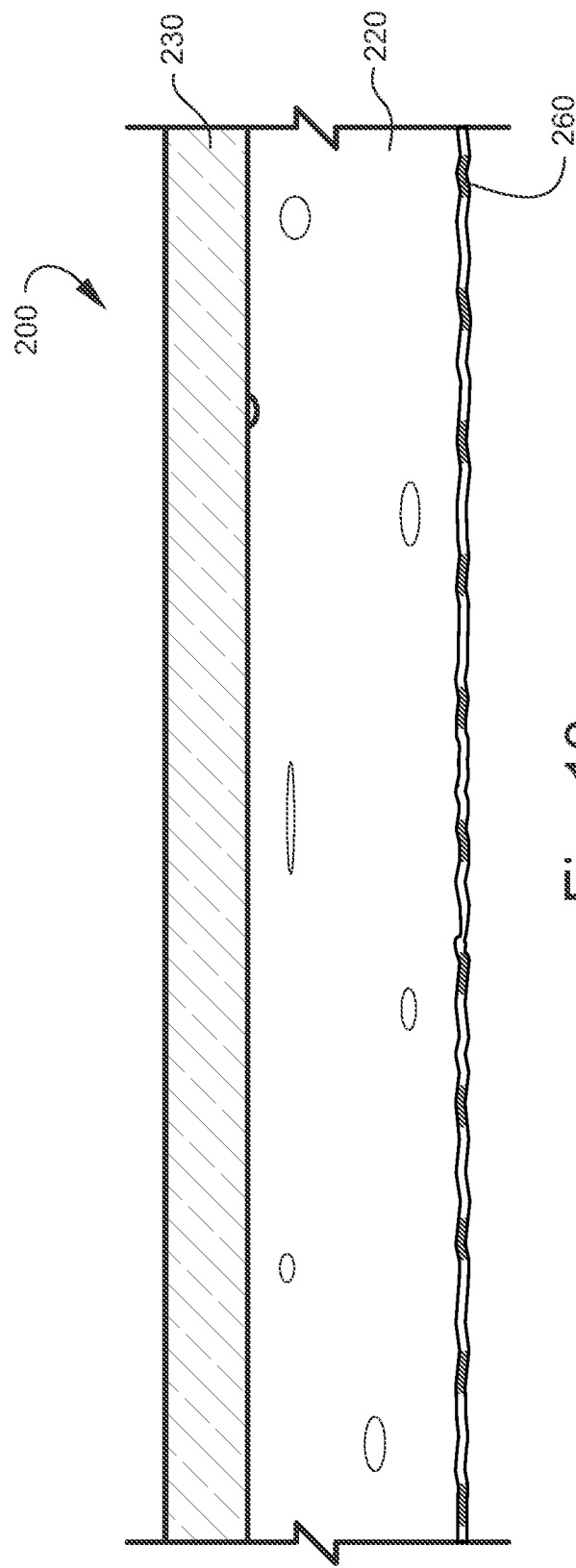
FIG. 13 is a side view of an embodiment of the invention.
Figure 14:
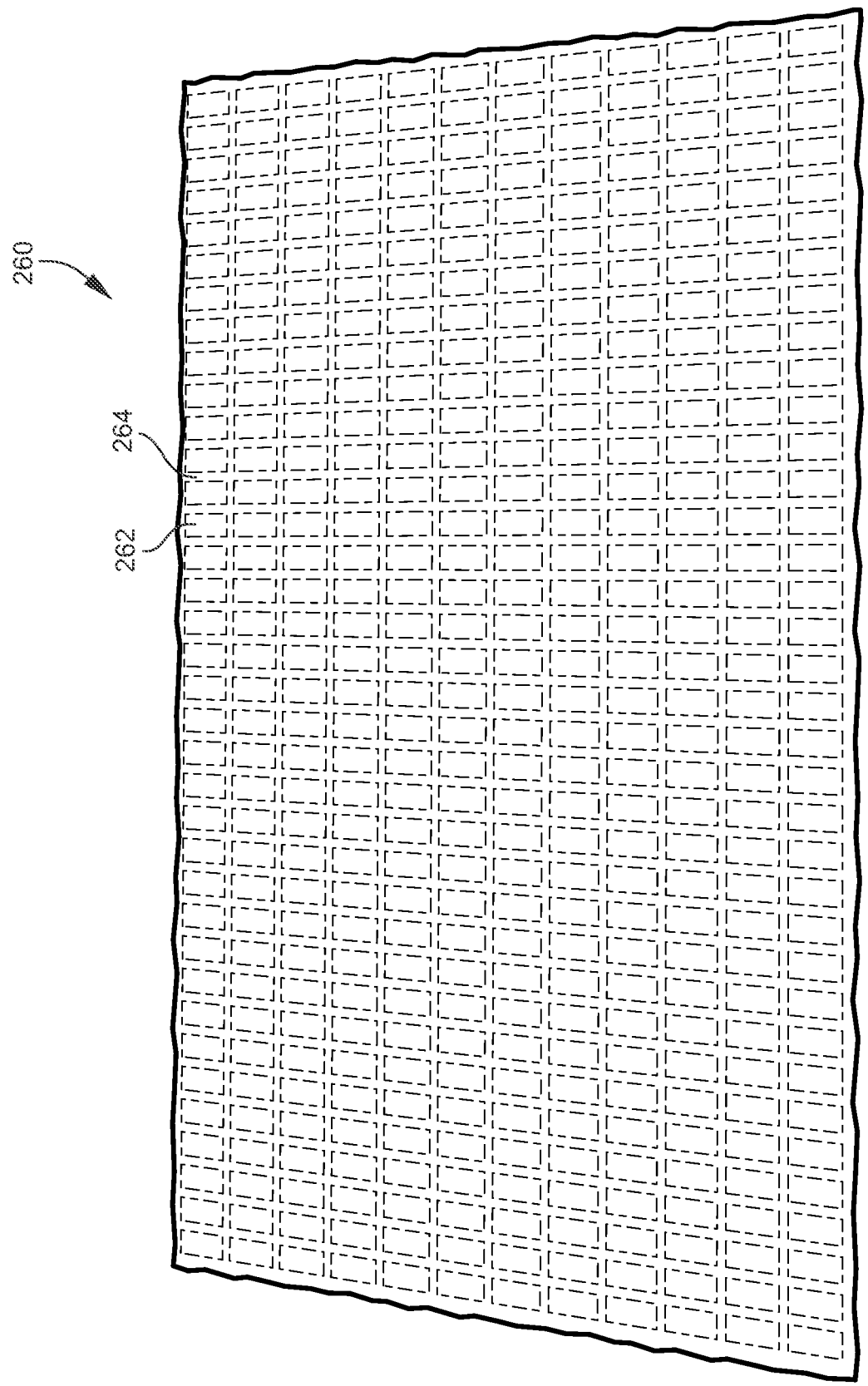
FIG. 14 is a top perspective view of the PCM layer of the invention.
Figure 15:
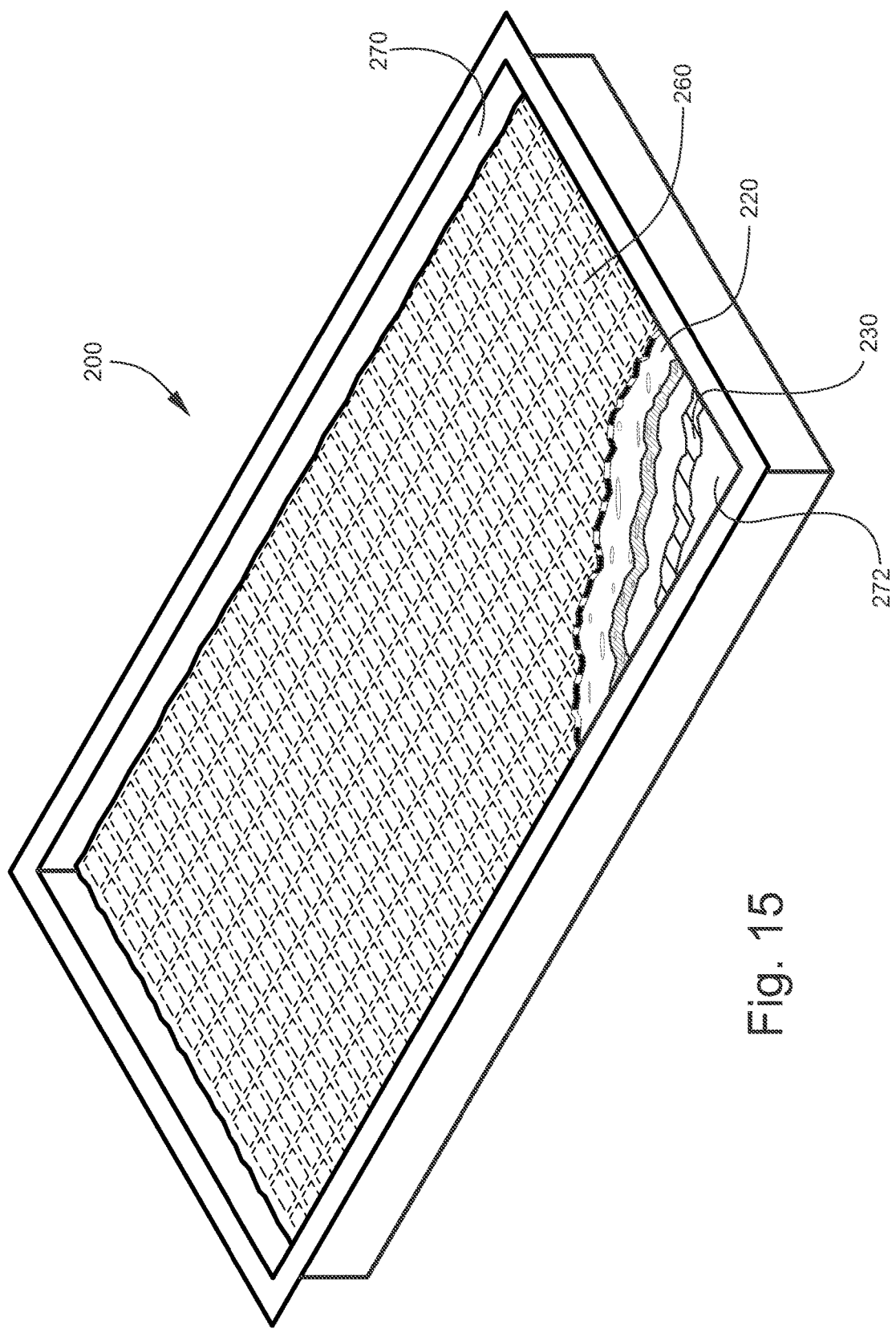
FIG. 15 is a top perspective view showing a partial cutaway view of the invention.

Referring to FIGS. 13, 14, and 15, the invention may further include an embodiment 200 utilizing a middle layer which may be a rigid magnesium oxide board 230, a first insulation layer 220 which is a two part rigid urethane pour foam, and a second insulation layer 260 which is a phase change material. The term "middle layer" is used with respect the embodiment 200 in order to be consistent with the above specification which utilizes the term "middle layer" 30, 130 in the other figures. However, middle layer 230 need not actually be in the "middle" as this embodiment 200 does not require a separate top layer or aesthetic element. Indeed, the middle layer 230 of embodiment 200 may itself also effectively function as a top layer or aesthetic element.

The second insulation layer 260 is a phase change material (PCM) as especially shown in FIG. 14. The PCM 260 has a plurality of cells 262 separated by seams 264. The cells 262 and the seams 264 may be constructed from thermoplastic materials. Most or all of the cells 262 may enclose a volume of the PCM composition. The PCM composition may include a super-saturated solution of calcium chloride hexahydrate among other compositions.

The embodiment 200 of FIGS. 13, 14, and 15 may be manufactured as shown especially in FIG. 15. A mold may be provided which has vertical sides 270 forming a continuous tray. The mold may have bottom 272. Alternatively, the magnesium oxide board 230 may also function as a bottom. The mold may also have injection ports (not shown). In order to manufacture the wall panel of embodiment 200, the magnesium oxide board 230 is first placed in the mold and the PCM material 260 is placed on top. Next, the two part rigid urethane pour foam 220 is injected between the magnesium oxide board 230 and the PCM 260. As the rigid urethane pour foam 220 cures, it forms a chemical bond with the both the magnesium oxide board 230 and the PCM 260. The chemical bond between the rigid urethane pour foam 220 and the magnesium oxide board 230, and the chemical bond between the rigid urethane pour foam 220 and the PCM 260 thus fuses all three layers together without the need for any other adhesives or attachment. The wall panel 200 may then be applied to a structural building element.

A wall panel system 10, 100, 200 according to the invention has been described with reference to specific embodiments and examples. Various details of the invention maybe changed without departing from the scope of the invention. Furthermore, the foregoing description of the preferred embodiments of the invention and best mode for practicing the invention are provided for the purpose of illustration only and not for the purpose of limitation, the invention being defined by the claims. It is envisioned that other embodiments "may perform similar functions and/or achieve similar results. Any and all such equivalent embodiments and examples are within the scope of the present invention and are intended to be covered by the appended claims.

We claim:

1. A method of manufacturing a wall panel, the method comprising:
   forming a glass-fiber reinforced rigid magnesium oxide layer including the steps of:
      i) pouring or injecting a slurry of uncured magnesium oxide into a mold,
      ii) embedding glass fiber reinforcing material therein, and
      iii) curing the magnesium oxide to obtain the glass-fiber reinforced rigid magnesium oxide layer having a first side and a second side;
   applying, to the second side of the rigid magnesium oxide layer, an insulation layer, the insulation layer comprising a foam.

2. The method according to claim 1, wherein the glass fiber reinforcing material is configured to be the principal load carrying member of the wall panel.

3. The method according to claim 2, wherein the method further comprises applying, to the first side of the rigid magnesium oxide layer, a veneer layer; and wherein the veneer layer is brick, ceramic tile, porcelain tile, natural stone, engineered stone, wood, ceramic, plastic, vinyl, or paint.

4. The method according to claim 1 further comprising applying, to the first side of the rigid magnesium oxide layer, a veneer layer.

5. The method according to claim 3, wherein the veneer layer functions as a water-resistive barrier.

6. A method of forming a wall panel system for a building structure, the method comprising:
   (a) providing a plurality of wall panels, each of the plurality of wall panels comprising:
      a rigid magnesium oxide layer having a first side and a second side, the rigid magnesium oxide layer having glass fiber reinforcing material embedded therein, wherein the rigid magnesium oxide layer has a matrix consisting essentially of magnesium oxide that retains the glass fiber in a desired location and orientation; and
      a foam layer on the second side of the rigid magnesium oxide layer;
   (b) securing each of the plurality of wall panels to a structural element; and
   (c) applying a sealing compound onto seams between the respective wall panels on the first side of the rigid magnesium oxide layer.

7. The method according to claim 6, wherein the seams are sealed with a sealing compound.

8. The method according to claim 6, further comprising, after step (c), applying a veneer layer onto the wall panel system, wherein the veneer layer is applied onto the first side of the rigid magnesium oxide layer.

9. The method according to claim 8, wherein the veneer layer is applied to overlap the seams between respective wall panels.

10. The method according to claim 8, wherein the veneer layer is brick, ceramic tile, porcelain tile, natural stone, engineered stone, wood, ceramic, plastic, vinyl, or paint.

11. The method according to claim 8, wherein the veneer layer functions as a water resistive barrier.

12. The method according to claim 6, wherein the glass fiber reinforcing material is configured to be the principal load carrying member of each wall panel of the plurality of wall panels.

13. The method according to claim 6, wherein the foam layer has a uniform thickness and an insulation factor greater than or equal to R7 and less than or equal to R21.

14. The method according to claim 6, wherein the rigid magnesium oxide layer is a poured, injected, press-molded, extruded, vibration cast, sprayed, or slip formed layer.

* * * * *